United States Patent
Allen et al.

(10) Patent No.: US 12,541,775 B2
(45) Date of Patent: Feb. 3, 2026

(54) UNIQUE METHOD OF PROCESSING API DATA SUPPORTING WIDE VARIETY OF DATA TYPES AND MULTIPLE/SINGULAR FORMATS WITHOUT DATA DUPLICATION

(71) Applicant: Capital One Services, LLC, McLean, VA (US)

(72) Inventors: Nicholas Allen, Frisco, TX (US); Vaishnavi Kakumani, McKinney, TX (US); Vishwanath Hiremath, McKinney, TX (US); Sreekanth Krishnamoorthy, Dallas, TX (US); Andrew Baldwin, Dallas, TX (US); Dirgh Rabadia, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 225 days.

(21) Appl. No.: 18/200,341

(22) Filed: May 22, 2023

(65) Prior Publication Data
US 2024/0394756 A1 Nov. 28, 2024

(51) Int. Cl.
*G06Q 30/02* (2023.01)
(52) U.S. Cl.
CPC .................. *G06Q 30/0278* (2013.01)
(58) Field of Classification Search
CPC .................................. G06Q 30/0278
See application file for complete search history.

(56) References Cited

U.S. PATENT DOCUMENTS

| | | | |
|---|---|---|---|
| 6,385,594 B1* | 5/2002 | Lebda | G06F 40/174 |
| | | | 705/38 |
| 11,205,186 B2 | 12/2021 | Scavo | |
| 11,227,001 B2 | 1/2022 | Rege et al. | |
| 2003/0061245 A1* | 3/2003 | Soria, Jr. | G06F 16/219 |
| | | | 707/999.203 |
| 2003/0210241 A1* | 11/2003 | Minami | G06T 19/00 |
| | | | 345/418 |

(Continued)

OTHER PUBLICATIONS

Pudaruth, S. (2014). Predicting the price of used cars using machine learning techniques. Int. J. Inf. Comput. Technol, 4(7), 753-764. (Year: 2014).*

(Continued)

*Primary Examiner* — John S. Wasaff
(74) *Attorney, Agent, or Firm* — Sterne, Kessler, Goldstein & Fox P.L.L.C.

(57) ABSTRACT

A computer-implemented approach is described that includes receiving a mass price computation request for a plurality of deals involving a plurality of vehicles. The request includes a data structure configured to store input values, and a tri-value field configured to store a tri-value, the tri-value being one of a first value, a second value, or a third value, the first value indicating a single computation is requested using the input values, the second value indicating a limited set of combinatorial calculations to be calculated using the input values, and the third value indicating a full set of combinatorial calculations using the input values. The approach further causes computing of each of the plurality of deals based on the data structure, and outputting results to a user device based on the mass price computation request.

20 Claims, 4 Drawing Sheets

(56) References Cited

U.S. PATENT DOCUMENTS

| | | | |
|---|---|---|---|
| 2014/0040182 A1* | 2/2014 | Gilder | G06F 16/256 |
| | | | 707/602 |
| 2018/0108058 A1* | 4/2018 | Cotton | G06Q 40/03 |
| 2020/0065885 A1* | 2/2020 | Smith | G06Q 30/0278 |
| 2021/0192437 A1* | 6/2021 | Dhandapani | G06Q 10/087 |
| 2021/0390204 A1 | 12/2021 | Jagtap et al. | |
| 2022/0129577 A1 | 4/2022 | Joshy | |
| 2022/0164814 A1* | 5/2022 | Baghestani | G06Q 30/0278 |
| 2022/0318858 A1* | 10/2022 | Wu | G06Q 30/0278 |

OTHER PUBLICATIONS

Talukdar, S. N., Pyo, S. S., & Giras, T. C. (2007). Asynchronous procedures for parallel processing. IEEE transactions on power apparatus and systems, (11), 3652-3659. (Year: 2007).*

* cited by examiner

```
{
  "calculationType": "LIMITED",
  "calculationInputs": [
    {
      "name": "CASH_DOWN",
      "values": "[5500.00, 6000.00, 6500.00, 7000.00, 7500.00]",
      "version": 1,
      "valueType": "Double",
      "isCollectiveInput": true
    },
    {
      "name": "VEHICLE_BOOK_VALUE",
      "values": "[20000.00, 32000.00]",
      "version": 1,
      "valueType": "Double",
      "isCollectiveInput": true
    }
  ],
  "requestedValues": [
    {
      "name": "DOWN_PYMT",
      "version": 1
    }
  ]
}
```

UNIQUE METHOD OF PROCESSING API DATA SUPPORTING WIDE VARIETY OF DATA TYPES AND MULTIPLE/SINGULAR FORMATS WITHOUT DATA DUPLICATION

BACKGROUND

Transferring data within and between computing environments supporting the processing of commercial consumer offerings may include a wide variety of data necessary for those computations to take place. This data can vary widely from the uncomplicated data needed to support a simple commercial consumer offering request to elaborate data needed to support a complex set of commercial consumer offering requests covering a range of financial scenarios. Data structure designs that can support the wide range of data supporting the expansive possible requests have not kept pace with the wide variety of data needs in the modern commercial consumer marketplace. In the abstract, one might employ a different, unique data structure design for each different type of commercial consumer data. However, use of unique data structures in support of each request precludes the ability to readily support, and to scale requests simultaneously in support of a large number of interested consumers seeking a large choice of commercial consumer financial offerings.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Overview

Transferring data within and between computing environments may include data necessary for the computation of a multitude of various commercial offerings to an interested consumer. The interested consumer is typically one of many consumers who would make such requests at any given time, thereby increasing the scrutiny of the technical performance of the delivery of the desired results. In providing a rich set of potential commercial offerings to the interested consumer, modern technical performance demands that not only that these commercial offerings be available for computation, but that these results be made available within a timeframe commensurate with the attention span of the interested consumer. Such technical demands need to be met even using the distributed processing architecture in use. While distributing the processing workload across a number of processes, care must be taken to minimize the overhead of data being transferred so that the advantages of the distributed processing are fully realized.

In addition, presentation of information to a consumer with a satisfactory customer experience requires that a sufficiently large volume of choice of deals be provided in a sufficiently short amount of time. For example, some consumer experience studies have shown that in the context of consumer purchasing of vehicles, pricing alternatives need to be provided in the timeframe of 1 second in order for the process to be regarded as a satisfactory experience.

In solving the above technical problems of transferring data within and between computing environments, it was determined that one aspect of the technical solution is the devising of a data structure to optimally transfer the data representative of information regarding the various commercial offerings to the interested consumer. The data structure devised solved a variety of additional technical challenges, including having the flexibility of description of the rich variety of the multitude of various commercial offerings of interest to the interested consumer, without duplication. In an additional technical challenge, it is desirable that the data structure be fixed during the exchange of information across the various processing capabilities in the modern processing server and services framework. By fixed, it is desired that the format data structure is unchanged, other than the additional/removal/change of data within the data structure. Furthermore, the various processing services within the distributed processing framework expect that data be data-typed, and thus, thus data structure must be designed to provide data in typed form. In effect, this requirement invokes the need for the input processing to be able to transform the input data into typed data for the population of the data structure.

In addition, the data structure is required to have the flexibility to capture data whose range may extend from a single request or a multiple request. For example, an interested consumer may have an interest in a single deal involving a single vehicle. In another example, another interested consumer may be interested in looking at multiple vehicles, each with a variety of alternative proposals of an expression of interest. The multiple vehicle-multiple proposals requires the data structure to efficiently describe the combinatorial problem of the multiple requests. Various examples need to address the ordered vehicle-proposal pairs that reflect the multitude of requests of interest to a particular interested consumer. In terms of efficiency, it is desirable to be able to apply the same type of parameter to multiple requests, rather than repeat the same parameter for each and every request to which it applies.

Furthermore, it is desirable that the design of the data structure avoids duplication of the values it carries. Avoiding duplication of the same value being used in multiple transactions avoids unnecessary transfer of the same values multiple times, with the benefit of increased transfer speed, reduced storage requirements, and a resulting improved overall architectural efficiency.

In the modern connected computational world, where relevant data is distributed across a multitude of databases in a wide variety of locations, the process by which the distributed computations take place are critical in terms of achieving the proper timeframe of those computations. These computations are typically performed by a multitude of microservices servers. However, the latency introduced by the microservices causes the large computational tasks, such as mass scoring, to be no longer performant. Such latencies result in various computations of the overall set of values to be not in order, and to negate the ability to timely provide a set of vehicle deals within the desired timeframe to a prospective consumer.

In order to meet these objectives, a variety of innovations were pioneered. In some aspects, the innovations included an aggregation of multiple parameters (e.g., vehicles and/or deals) into one request. In other aspects, the normal set of sequence of computation steps for the deal calculation are converted into parallel execution steps. As such, the computation of multiple deals/vehicles uses parallel execution, with a resulting acceleration in the computation. While the parallel execution results in computational accelerations, the resulting results will inevitably be out of order. As such, in certain aspects, it is necessary to track the original order of request so that the re-aggregation of the results may be accomplished. In some embodiments, the tracking for re-aggregation purposes may be accomplished by using an ordered list, such as using a list index.

The design of the data structure needs to accommodate a variety of data types, including data types that capture policy constraints, data types that capture financial values, and data types that capture variables whose values are output to the prospective consumer.

Variables that capture policy constraints include credit constraints, such as credit term, credit life, accident health coverage, gap insurance, loan to value, consumer income, payment to income ratio, amount to finance, vehicle dealer APR. Other constraints captured by variables include those directed at the vehicle(s) involved (vehicle to be purchased, trade-in vehicle), including maintenance, warranty, and vehicle mileage. These constraints are not exhaustive but representable of the variables involved in making decisions.

To further assist in the description of the data structure, a variety of exemplary parameters will be used to further illustrate the concepts. Like the above list of variables, the list below of parameters is not exhaustive, but is merely representative of the type of parameters that may be used as part of the calculations discussed below. In addition, the names used for the various items in the list are merely exemplary, as one of ordinary skill in the art would recognize. The exemplary list is:

Cash_Down=Cash Down by purchaser in support of the deal,
Dealer_Group=Identification of Group to which the Dealer belongs,
Credit_Report=Value of credit score by prospective purchaser,
Trade_Present=Boolean variable indication of presence of Trade-in Vehicle,
Submitted_APR=Desired Annual Percentage Rate (APR) of prospective purchaser,
App_Received_Date=Date of receipt of Financing Application,
Applicable_Policies=List of one or more Policies applicable to prospective transaction,
Dealer_Territory_ID=Identification of Territory in which Dealer is located,
Vehicle_Book_Value=Book value of vehicle to be purchased,
Deal_Term=Term of financial obligation,
Applicant_Residency=State of residency of prospective purchaser,
Trade_In_Amt_Owed=Amount owing on trade-in vehicle,
Total_Trade_Amt=Total Trade Amount,
Manufactuer_Rebate=Amount of manufacturer rebate for vehicle to be purchased,
Sale_Price=Sale price of vehicle to be purchased,
TTL_Fees=Total fees required to be paid as part of the purchase, and
Warranty=Value of warranty available with purchased vehicle.

Exemplary Data Structure

Figure 1:
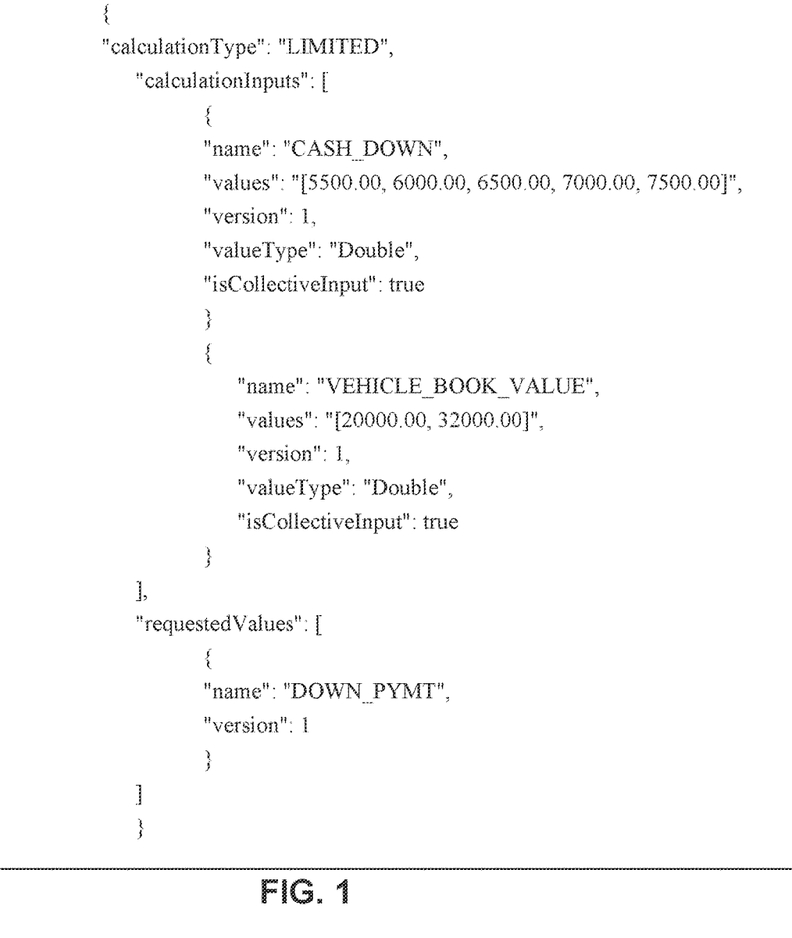
FIG. 1 illustrates an exemplary version of the data structure, in accordance with some aspects.

FIG. 1 illustrates an exemplary version of the data structure, in accordance with some aspects. In response to the above requirements, the following exemplary data structure has been devised in response to the above technical challenges. Below is provided an overview of an embodiment of the data structure.

```
{
  "calculationType": "LIMITED",
    "calculationInputs":
      {
        "name": "CASH_DOWN",
        "values": "[5500.00, 6000.00, 6500.00, 7000.00, 7500.00]",
        "version": 1,
        "valueType": "Double",
        "isCollectiveInput": true
      }
    ],
    "requestedValues": [
      {
        "name": "DOWN_PYMT",
        "version": 1
      }
    ]
}
```

As the above embodiment shows, the data structure has three parts: (1) calculationType, (2) one or more calculationInputs, and (3) one or more requestedValues. As one of ordinary skill in the art would recognize, the names of the three parts are exemplary, and may be replaced by other names without loss of generality. In an embodiment, the part "calculationType" is a tri-value parameter, i.e., it may have one of three values, (1) SINGLE, (2) LIMITED, or (3) FULL. Similar to the above, the names of the three values are exemplary, and may be replaced by other names without loss of generality. The value "SINGLE" indicates that a single calculation is desired using the one or more values provided in the calculationInputs section. The SINGLE calculation may result in multiple output values, such as Down_Pymt, Gap_Insurance, Term, Trade_In_Amount, Price, and "Amount_To_Finance. The following is a particular example of SINGLE calculation. The calculation is provided values for each of the following input variables: Cash_Down, Dealer_Group, Credit_Report, Trade_Present, Submitted_APR, App_Received_Date, Applicable_Policies, Dealer_Territory_ID, Vehicle_Book_Value, Deal_Term, Applicant_Residency, Trade_In_Amt_Owed, Total_Trade_Amt, Manufactuer_Rebate, Sale_Price, TTL_Fees, and Warranty. With this set of input values, and the calculation Type of SINGLE, a single calculation results from the input values. The SINGLE calculation may result in multiple values, such as Down_Pymt, Gap_Insurance, Term, Trade_In_Amount, Price, and "Amount_To_Finance. Put simply, the output values are the down payment required, the gap insurance coverage required, the term, the trade-in amount, price and amount to finance values that are necessary to support the requirements that have been input. In summary, for the SINGLE type of calculation, each input value has one value, and the resulting one or more output values are computed based on those desired input values.

The value "LIMITED" indicates that more than one calculation is requested by the number of values provided for one or more calculationInputs. In this type of calculation, at least one parameter has multiple values, and thereby multiple deal calculations are done for each of those parameters. When more than one parameter has multiple values, each set of multiple values will have the same number of values. For example, suppose a prospective purchaser would like to offer different amounts of cash down for two different vehicles, with all other parameters being unchanged between the two different financial calculations. In this example, the list price of the two vehicles might be $20,000 and $32,000, and the prospective purchaser wishes to offer $5,000 and $8,000 cash down respectively. In an exemplary formulation, the two parameters in the data structure would be described as follows:

```
{
  "name": "CASH_DOWN",
  "values": "[5000.00, 8000.00]",
  "version": 1,
  "valueType": "Double",
  "isCollectiveInput": true
}
{
  "name": "VEHICLE_BOOK_VALUE",
  "values": "[20000.00, 32000.00]",
  "version": 1,
  "valueType": "Double",
  "isCollectiveInput": true
}
```

Note that in the above exemplary data structure the nature of the multiple values is signaled by the field "isCollectiveInput" being set to true. When set to true, the associated meaning is that the two values are values for two separate financial deals, where the first value is used with the first value of the other parameters. In addition, the field "isMultipleDeal" indicates whether the relevant value is constant for all the inputs, or is applied individually to each input separately. The field "isMultipleDeal" thus enables the relevant value to be provided once, and to thereby avoid the need to repeat the relevant value for each of the inputs.

The value "FULL" indicates that a combinatorial set of calculations is desired, whereby each combination of all of the input values provided is computed to yield a result for that combination. In this type of calculation, at least two parameters have multiple values, and multiple deal calculations are done for each combination of each of those parameters. Thus, if one parameter has 3 values, a second parameter has 2 values, and all other parameters have only one value, then a total of 6 deal calculations should be undertaken. Turning to a specific example, suppose a prospective purchaser would like to offer two different amounts of cash down for three different vehicles, with all other parameters being unchanged. In this example, the list price of the three vehicles might be $20,000, $25,000 and $32,000, and the prospective purchaser wishes to offer $5,000 and $8,000 cash down for each of these vehicles. In an exemplary formulation, these two parameters in the data structure would be described as follows:

```
{
  "name": "CASH_DOWN",
  "values": "[5000.00, 8000.00]",
  "version": 1,
  "valueType": "Double",
```

-continued

```
  "isCollectiveInput": true
}
{
  "name": "VEHICLE_BOOK_VALUE",
  "values": "[20000.00, 25000.00, 32000.00]",
  "version": 1,
  "valueType": "Double",
  "isCollectiveInput": true
}
```

In certain embodiments of the data structure, the following additional fields may be populated for each input parameter in the data structure. For each parameter, its type is provided. Exemplary types include Integer, IntegerArray (multiple integers), Double (floating point numbers), DoubleArray (multiple floating point numbers), String (alphanumerics), StringArray (multiple alphanumerics), Boolean (True or False), Calendar (date), and Map. In some embodiments, for each parameter, its version is identified. The version reflects the particular version of data structure design. Example values for a version include null (i.e., version not applicable), 0, 1 and the like.

Output parameters are typically specified in the data structure by their name, and optionally by their version. Thus, for example, an exemplary set of output parameters may be as follows:

```
"requestedValues": [
  {
    "name": "DOWN_PYMT",
    "version": 1
  },
  {
    "name": "GAP_INSURANCE",
    "version": 1
  },
  {
    "name": "TERM",
    "version": 1
  },
  {
    "name": "TRADE_IN_AMOUNT",
    "version": 1
  },
  {
    "name": "PRICE",
    "version": 1
  },
  {
    "name": "AMOUNT_TO_FINANCE",
    "version": 1
  }
]
```

In the above particular example, the requestedValues for the single calculation are the down payment, the gap insurance, the loan term, the trade-in amount, the price of the vehicle, and the amount to finance that is compatible with the calculated financial transaction, and supported by the various policy constraints at play.

A relevant consideration to the above design of the data structure is that the contract between the data structure and functionality using the data in the data structure is not changed with change data. Thus, for example, updated data may be deposited into the data structure, but the meaning of the parameters themselves is unchanged, despite the change or update in data.

In addition to the above specifics, various embodiments may include additional features. For example, the "version" field may be included so as to permit later version of the data structure that include additional capability. In such a situation, the "version" field allows users of the data stored in the data structure to be treated differently, where the additional capability warrants. In certain embodiments, backwards compatibility is ensured.

Furthermore, the data structure may be transferred in text form, or may be transferred in other forms, including binary form or encrypted form. In other words, the data structure design supports a flexibility of data formats.

Exemplary Utilization Environment of Data Structure

Figure 2:
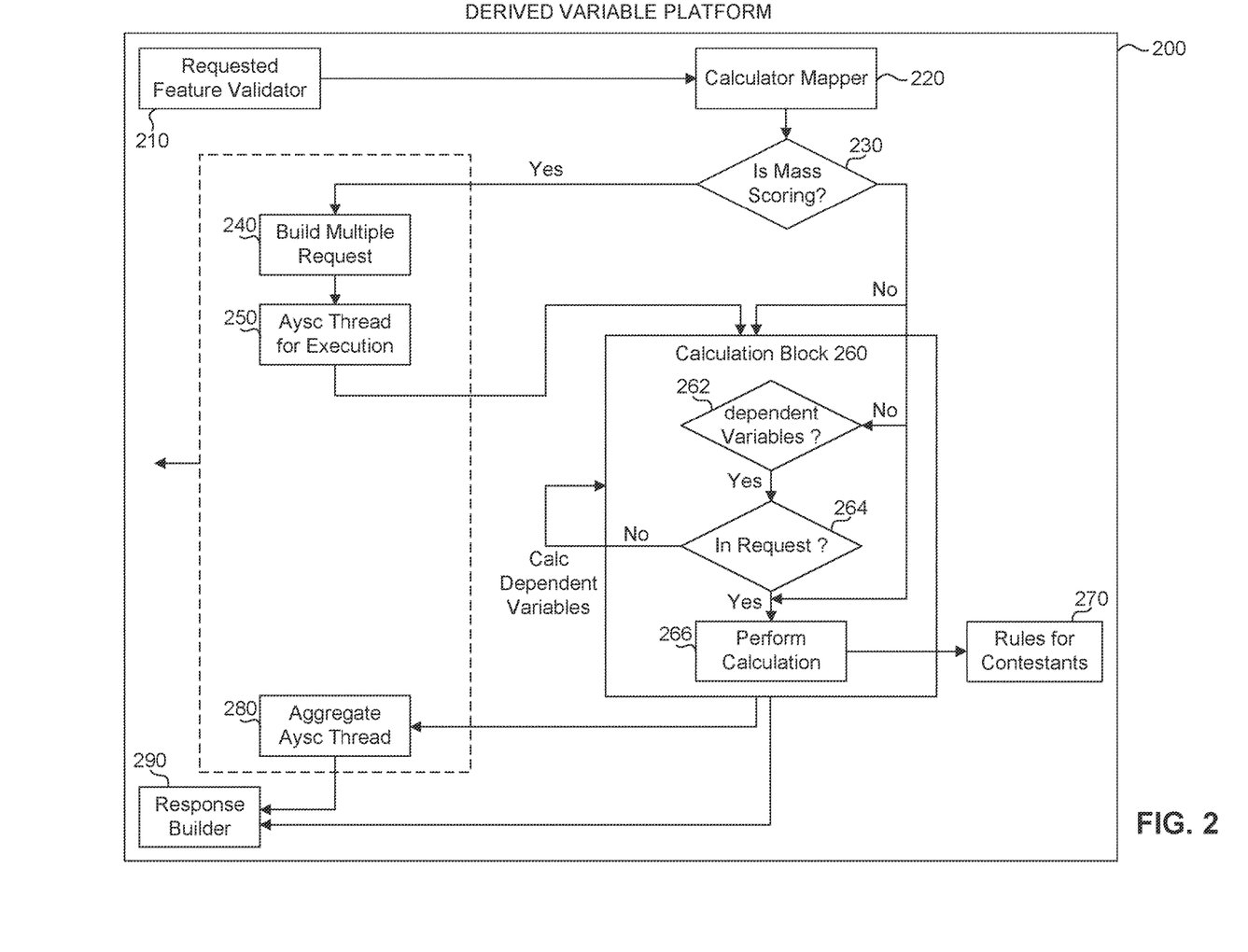
FIG. 2 is an architectural flowchart illustrating an example response builder 200 using the proposed data structure, according to some aspects of the invention.

FIG. 2 is an architectural flowchart illustrating an example response builder 200 using the proposed data structure, according to some aspects of the invention. The data structure discussed above may be used as part of the input to example response builder 200. The method begins with validation 210 by requested feature validator. In this step, the features described in the data structure are analyzed for validity. Features may be invalid for various reasons including syntax, incorrect values, in compatible fields, and the like. If any aspects of the features are invalid, several possibilities may occur. An error message may be generated, and the response builder process is terminated. Alternatively, if the error is logically correctable, a repair (with notification) may correct the error in the feature.

In step 220, mapping occurs by a calculator mapper. For each requested feature, calculation mapper 220 identifies the relevant calculator (or function) based on the name of the requested feature. The relevant calculator then takes the appropriate inputs and provides the value of the requested feature. In step 230, it is determined whether the calculation is a mass scoring calculation. As discussed above, the term "mass scoring" means that a single computation is not contemplated. Instead, the data structure indicates that a plurality of computations are to be undertaken based on various permutations and combinations of the parameter values provided. If "mass scoring" is indicated by the input data structure, the method proceeds to step 240. In step 240, the building of multiple calculation requests occurs based on the permutations and combinations defined in the data structure. Thus, if the data structure indicates "FULL" and two possible down payments are to be applied to three possible vehicles for purchase, then a total of 6 calculation requests would be generated. Following step 240, step 250 occurs, in which the computation is packaged as one or more asynchronous threads for execution. In another embodiment, other alternative approaches to the execution of each of the multiple requests may be used, and falls within the scope of the current approach.

In step 260, calculation of each request is undertaken. Step 260 follows step 250 (packaging of the computation into one or more asynchronous threads for execution) or follows step 230, when it is it is determined that the calculation is not a mass scoring calculation. Calculation step 260 includes various substeps 262, 264 and 266. Substep 262 makes a determination of whether there are dependent variable values that are required in order for the calculation to proceed. If it is determined that the values of one or more dependent variables are required to complete the calculation, in step 264, a determination is made as to whether these values are in the received request. If these dependent variables are not available within the request itself, then these values of the dependent variables are calculated. In this context, dependent variables are variables that are not provided directly as inputs in the calculation request, but are intermediate values needed to perform the desired calculation of the value of the end variable. If the value of the dependent variables is not available, then the value of these dependent variables are calculated. Once the values of the dependent variables, if needed, are extracted from the Request or are calculated, the desired calculation is performed in step 266. In performing step 266, one or more rules may be retrieved as necessary, such a retrieval occurring in step 270.

Upon completion of calculation step 260 for each calculation using the relevant threads, in step 280, the results from these relevant threads are aggregated. Finally, in step 290, building of the requested response occurs using the aggregated information.

Further information on the above response builder 200 and its related policy engine may be found in U.S. application Ser. No. 18/200,330 concurrently filed herewith, titled "Method to Enable Parallelization and Integration of Microservices to a Highly Performant Monolith Structure," the contents of which are incorporated herein in its entirety.

Initial attempts to partition the above computation work for processing used an approach of subdividing the work load into separate parts, which were then sent to a number of microservices servers for computation, and the results returned thereafter. However, such an approach failed as the total time for the computation, including the latency resulting from the transmission times to and from the microservices servers, meant that the desired turn-around time of, for example one second, could not be met for a reasonable number of vehicular deals requested from the prospective consumer. Nor could any straightforward use of separate threads overcome the challenge of a turn-around time of one second for a reasonable number of vehicle deals requested by the prospective consumer.

A new approach was developed to overcome these technical challenges for the deal computations described above using a microservices distributed computing approach. Such an approach addressed both technical challenges of achieving the desired turnaround time for presentation of deal results (e.g., one second) for large numbers of deals and vehicles, as well as dealing with scalability for these calculations when using distributed microservices computing resources.

Microservices are granular processes that fulfill a narrow task while remaining as technology-agnostic as possible, and thus can be performed by a wide variety of technology. Microservices are typically delivered across a network and may be deployed independently. Microservices are related only in a very loose manner, which allows for implementing and updating individual microservices, rather than entire applications or architectures. While the loose ties between processes makes for easier changes and improvements, it also creates additional challenges in terms of coordination.

The scale of the deals encompassed by aspects of this approach may be thought of as the cartesian product of deals and vehicles. Here, deals mean the requested financial parameters being contemplated by a prospective consumer for each vehicle. For example, in a given scenario, a prospective consumer may wish to request multiple financial scenarios for a given vehicle. That same prospective consumer may also wish to request multiple financial scenarios for each of a number of multiple vehicles. Thus, the scope of the technical problem being addressed includes a cartesian product from the two sets of deals and vehicles, i.e., the scope includes the set of all potential ordered combinations consisting of one deal from the set of deals and one vehicle from the set of vehicles under consideration for each prospective consumer using an application on their mobile device.

In the modern connected computational world, where relevant data is distributed across a multitude of databases in a wide variety of locations, the process by which the distributed computations take place are critical in terms of achieving the proper timeframe of those computations. These computations are typically performed by a multitude of microservices servers. However, the latency introduced by the microservices causes the large computational tasks, such as mass scoring, to be no longer performant. Such latencies result in various computations of the overall set of values to be not in order, and to negate the ability to timely provide a set of vehicle deals within the desired timeframe to a prospective consumer.

MassComputeApplicationPriceDecision breaks the multidimensional pricing calculations into four separate threads. The first thread is the multi-deal-vehicle computation of the risk score for each deal-vehicle combination. In an embodiment, a risk score may use various models. In the second thread, the pre-pricing derived variables request are prepared based on the multidimensional pricing calculations, and the request is sent off to the Derived Variables Platform. In the third thread, pricing for the multidimensional pricing calculations is determined using a model for each deal-vehicle combination. In the fourth thread, the post-pricing derived variables requests are prepared, and the requests are sent off to the Derived Variables Platform. Upon completion of the four threads in MassComputeApplicationPriceDecision, the preliminary PriceDecisionOutput is output, and routed to the CounterCreditPolicies.

The method includes computing using a first subprocess a risk score for each vehicle-deal requested in the multidimensional vehicle-deal request.

The method includes causing using a second subprocess a set of pre-pricing derived variables to be computed using first asynchronous parallel thread processing by a first plurality of microservices servers.

The method includes computing using a third subprocess a respective price for each vehicle-deal requested in the multidimensional vehicle-deal request.

The method includes causing, using a fourth subprocess and based on each respective price, a set of post-pricing derived variables to be computed using second asynchronous parallel thread processing by a second plurality of microservices servers.

Exemplary Flowchart

Figure 3:
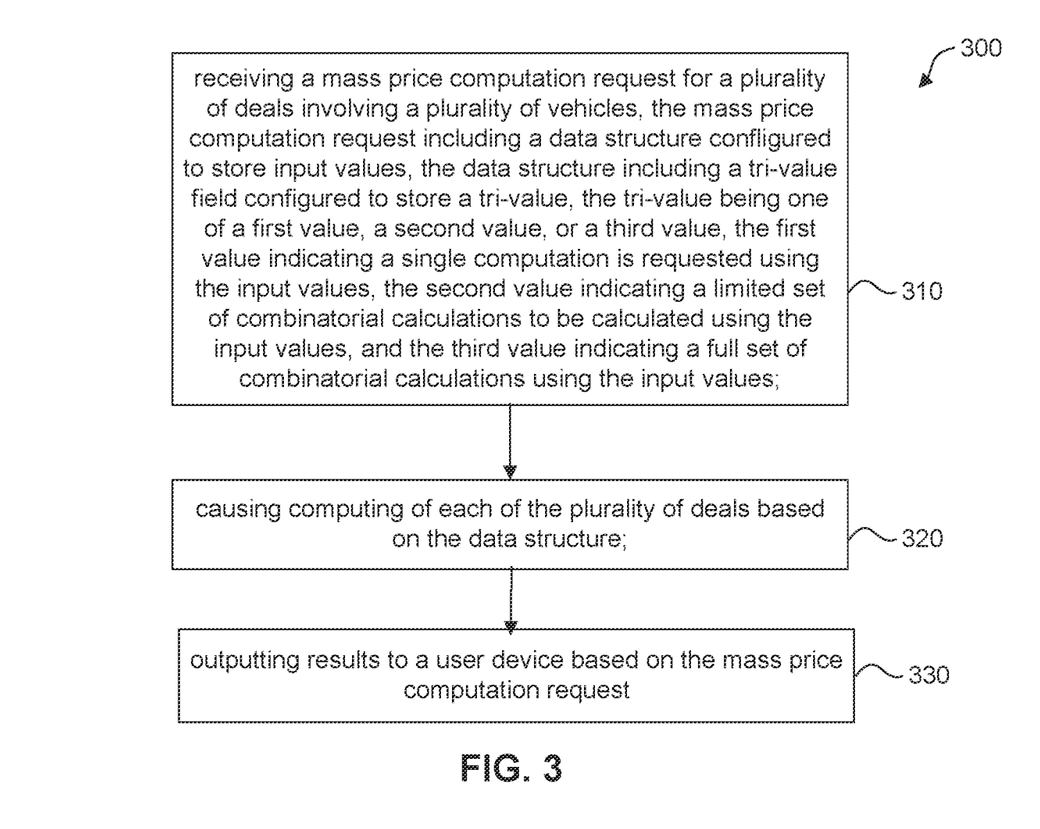
FIG. 3 illustrates an example computer-implemented method 300 for performing a mass price computation request, according to some aspects of this disclosure.

FIG. 3 illustrates an example computer-implemented method 300 for performing a mass price computation request, according to some aspects of this disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 3, as will be understood by a person of ordinary skill in the art. Method 300 shall be described with regard to the data structure of FIG. 1 and can be performed by the computer system 400 of FIG. 4. However, method 300 is not limited to the specific aspects depicted in those figures and other systems can be used to perform the method as will be understood by those skilled in the art.

In 310, the computing system 400 may receive a mass price computation request for a plurality of deals involving a plurality of vehicles. In 310, the mass price computation request includes a data structure configured to store input values, the data structure including a tri-value field configured to store a tri-value, the tri-value being one of a first value, a second value, or a third value, the first value indicating a single computation is requested using the input values, the second value indicating a limited set of combinatorial calculations to be calculated using the input values, and the third value indicating a full set of combinatorial calculations using the input values.

In 320, the computing system 400 causes computing of each of the plurality of deals based on the data structure.

In 330, the computing system 400 causes outputting results to a user device based on the mass price computation request.

The computing system 400 may receive a mass price computation request for a plurality of deals involving a plurality of vehicles via at least one of a user interface, a merchant webpage, or an application programming interface (API). Each mass price computation request may include respective user information. The respective user information may include data elements associated with the transaction request. For example, for each request within the mass price computation request, the data elements may include policy information, dealer information, credit information and financial calculation values.

In method 300, the computing system 400 may, for each request of the plurality of mass price computation request, determine or use microservices. The computing system 400 may determine or use the microservices based on the data elements associated with the mass price computation requests. Each microservice of the used microservices may be tasked to verify a respective data element of the data elements. For each request of the plurality of mass price computation request, the computing system 400 may determine the respective microservices by determining a type for each of the data elements, and determining that each microservice of the respective microservices is associated with at least one type of the types of the data elements.

In method 300, the computing system 400 may, for each request of the plurality of mass price computation request, send a part or all of the request to one or more microservices. For example, each microservice may be configured to communicate with an internal and/or third-party service to perform a part of, or all of, one or more requests. According to some aspects, a microservice may communicate with computing system 400 via networks including local area networks, the Internet, and the like.

Exemplary Computer Implementation

Figure 4:
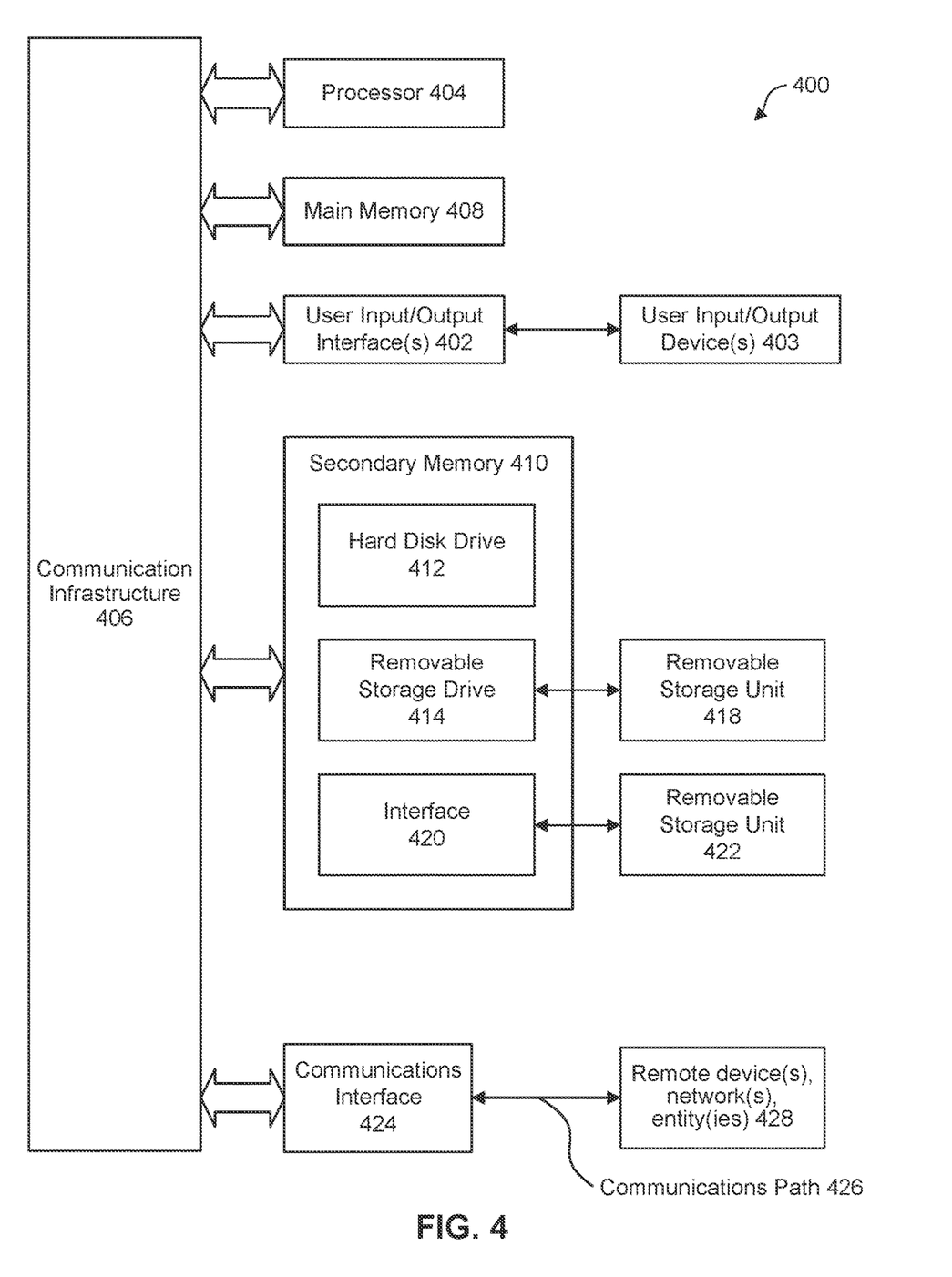
FIG. 4 is an example computer system useful for implementing various aspects disclosed herein.

Various aspects of this disclosure can be implemented, for example, using one or more computer systems, such as the computer system 400 shown in FIG. 4. Computer system 400 can be used, for example, to implement any method (e.g., method 300, etc.) described herein. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure 406 (a bus, etc.).

One or more processors 404 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (e.g., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, a tape backup device, and/or any other storage device/drive.

Removable storage drive 414 can interact with a removable storage unit 418. Removable storage unit 418 includes a computer-usable or readable storage device having stored thereon computer software (control logic) and/or data. The removable storage unit 418 can be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 can include other means, instrumentalities, or other approaches for allowing computer programs and/or other instructions and/or data to be accessed by computer system 400. Such means, instrumentalities, or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer-implemented method comprising:
receiving a mass price computation request for a plurality of deals involving a plurality of vehicles, the mass price computation request including a data structure configured to store input values, the data structure including a tri-value field configured to store a tri-value, the tri-value being one of a first value, a second value, or a third value, the first value indicating a single computation is requested using the input values, the second value indicating a limited set of combinatorial calculations to be calculated using the input values, and the third value indicating a full set of combinatorial calculations using the input values;

causing computing of each of the plurality of deals based on the data structure, wherein the computing includes:
  computing using a first sub-process a risk score for each vehicle-deal requested in a multidimensional vehicle-deal request,
  causing using a second sub-process a set of pre-pricing derived variables to be computed across a network using first asynchronous parallel thread processing by a first plurality of micro-services servers,
  packaging computing, as part of the causing using the second sub-process, of the set of pre-pricing derived variables into one or more asynchronous threads for execution by the first plurality of micro-services servers in the network,
  computing using a third sub-process a respective price for each vehicle-deal requested in the multidimensional vehicle-deal request, and
  causing, using a fourth sub-process and based on each respective price, a set of post-pricing derived variables to be computed across the network using second asynchronous parallel thread processing by a second plurality of micro-services servers,
  packaging computing, as part of the causing using the fourth sub-process, of the set of post-pricing derived variables into one or more asynchronous threads for execution by the second plurality of micro-services servers in the network; and
outputting results to a user device based on the mass price computation request.

2. The method of claim 1, wherein a type of input values includes one of Integer, IntegerArray, double, doubleArray, String, StringArray, Map, Boolean, and Calendar.

3. The method of claim 1, wherein the data structure is a text file or an encoded file.

4. The method of claim 1, wherein at least one of the input values is associated with a credit policy.

5. The method of claim 1, wherein at least one of the input values is associated with a dealer involved with the plurality of vehicles.

6. The method of claim 1, wherein at least one of the input values is associated with a financial computation.

7. The method of claim 1, wherein the causing computing includes causing computing of one or more output values to form the results.

8. The method of claim 1, wherein receiving the mass price computation request includes receiving the mass price computation request via an application programming interface.

9. The method of claim 1, wherein the data structure is further configured to store updated input values.

10. The method of claim 1, wherein the data structure is further configured to store a version number for a parameter associated with at least one of the input values.

11. A non-transitory machine-readable storage medium that provides instructions that, if executed by at least one computing device, are configurable to cause said at least one computing device to perform operations comprising:
  receiving a mass price computation request for a plurality of deals involving a plurality of vehicles, the mass price computation request including a data structure configured to store input values, the data structure including a tri-value field configured to store a tri-value, the tri-value being one of a first value, a second value, or a third value, the first value indicating a single computation is requested using the input values, the second value indicating a limited set of combinatorial calculations to be calculated using the input values, and the third value indicating a full set of combinatorial calculations using the input values,
  computing the plurality of deals involving the plurality of vehicles based on the data structure, wherein the computing includes:
    computing using a first sub-process a risk score for each vehicle-deal requested in a multidimensional vehicle-deal request,
    causing using a second sub-process a set of pre-pricing derived variables to be computed across a network using first asynchronous parallel thread processing by a first plurality of micro-services servers,
    packaging computing, as part of the causing using the second sub-process, of the set of pre-pricing derived variables into one or more asynchronous threads for execution by the first plurality of micro-services servers in the network,
    computing using a third sub-process a respective price for each vehicle-deal requested in the multidimensional vehicle-deal request, and
    causing, using a fourth sub-process and based on each respective price, a set of post-pricing derived variables to be computed across the network using second asynchronous parallel thread processing by a second plurality of micro-services servers,
    packaging computing, as part of the causing using the fourth sub-process, of the set of post-pricing derived variables into one or more asynchronous threads for execution by the second plurality of micro-services servers in the network; and
  causes outputting of results to a user device based on the mass price computation request.

12. The non-transitory machine-readable storage medium of claim 11, wherein a type of input values includes one of Integer, IntegerArray, double, doubleArray, String, StringArray, Map, Boolean, and Calendar.

13. The non-transitory machine-readable storage medium of claim 11, wherein the data structure is a text file or an encoded file.

14. The non-transitory machine-readable storage medium of claim 11, wherein at least one of the input values is associated with a credit policy.

15. The non-transitory machine-readable storage medium of claim 11, wherein at least one of the input values is associated with a dealer involved with the plurality of vehicles.

16. The non-transitory machine-readable storage medium of claim 11, wherein at least one of the input values is associated with a financial computation.

17. The non-transitory machine-readable storage medium of claim 11, wherein the causing computing includes causing computing of one or more output values to form the results.

18. The non-transitory machine-readable storage medium of claim 11, wherein receiving the mass price computation request includes receiving the mass price computation request via an application programming interface.

19. The non-transitory machine-readable storage medium of claim 11, wherein the data structure is further configured to store updated input values.

20. The non-transitory machine-readable storage medium of claim 11, wherein the data structure is further configured to store a version number for a parameter associated with at least one of the input values.

* * * * *